2,932,643
Patented Apr. 12, 1960

2,932,643
GUANIDINE SALTS OF BARBITURIC ACIDS

Harold E. Zaugg, Lake Forest, and Raymond J. Michaels, Jr., Mundelein, Ill., assignors to Abbott Laboratories, Chicago, Ill., a corporation of Illinois No Drawing. Application April 1, 1957
Serial No. 649,601

7 Claims. (Cl. 260—256.4)

The present invention relates generally to new salts of barbituric acids and the thiobarbituric acids, and more particularly to bis-guanidine salts of the barbituric acids and the thiobarbituric acids having hypnotic and/or anesthetic activity.

Many barbituric acids and thiobarbituric acids and their salts have been found to be useful as hypnotic and/or anesthetic agents in the treatment of animals and/or humans. In order to use a barbiturate or thiobarbiturate for therapeutic purposes, however, it is important that the drug have a high degree of purity. One difficulty with many of the presently used barbiturates and thiobarbiturates is the difficulty of obtaining their salts in highly purified, non-hygroscopic form and this is, in part, due to the normally amorphous non-crystalline form of the alkali metal salts of the barbiturates and thiobarbiturates which are presently in common use.

It is therefore an object of the present invention to provide a salt of a barbituric or thiobarbituric acid which is crystalline, non-hygroscopic, and readily obtainable in a purified form.

It is also an object of the present invention to provide a method by which barbituric acids and thiobarbituric acids as well as the salts thereof can be readily prepared in a relatively pure form.

Other objects of the present invention will be apparent from the detailed description and the claims to follow.

It has been discovered that stable, crystalline salts are prepared by forming the bis-guanidine salt of barbituric acid compounds according to the following general formula:

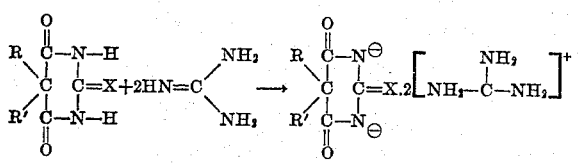

where R and R' are the same or different and are selected from the group consisting of lower alkyl, lower alkylene, monocyclo-alkyl, and monocyclo-alkylene, and X is a sulfur or oxygen atom.

The bis-guanidine salts having the above composition are stable, crystalline, non-hygroscopic salts which, even prior to recrystallization, can be used therapeutically as general anesthetics in the usual manner or can be further treated to obtain the highly purified corresponding acid free of the guanidine molecules, if desired.

The following specific examples are for the purpose of illustrating the present invention, but should not be construed to limit the invention to the precise materials or proportions used therein.

EXAMPLE I

*Bis-guanidine salt of 5-ethyl-5-(1-methylbutyl)-2-thiobarbituric acid*

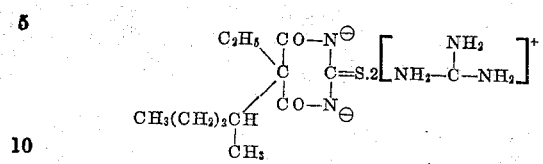

A solution of 19.1 g. (0.2 mole) of guanidine hydrochloride in 150 ml. of ethyl alcohol is added rapidly to an alcoholic sodium ethoxide solution prepared by adding 150 ml. of ethyl alcohol to 4.6 g. (0.2 mole) of sodium, under anhydrous conditions. Sodium chloride immediately precipitates from the reaction mixture. The mixture is stirred for about ten minutes at room temperature and filtered to remove the sodium guanidine. A solution of 300 cc. of ethyl alcohol and 24.2 g. (0.1 mole) of 5-ethyl-5-(1-methylbutyl)-2-thiobarbituric acid is added to the alcohol solution of guanidine and the mixture warmed on a steam bath to about refluxing temperature. The reaction mixture is allowed to stand at room temperature over night, whereupon the product, bis-guanidine salt of 5-ethyl-5-(1-methylbutyl)-2-thiobarbituric acid, is completely crystallized from solution. After cooling, the solution is filtered and dried to yield 23.5 g. of crystalline bis-guanidine salt of 5-ethyl-5-(1-methylbutyl) - 2 - thiobarbituric acid having a M.P. of 195–196° C. On chemical analysis the said salt as thus obtained, is found to contain 42.48% C; 8.04% H and 30.53% N; as compared with a theoretical analysis of the hemihydrate, $C_{13}H_{28}N_8O_2S \cdot \frac{1}{2}H_2O$=42.26% C; 7.91% H and 30.33% N.

EXAMPLE II

*Bis-guanidine salt of 5-ethyl-5-(1-methylbutyl)-barbituric acid*

Following the procedure of Example I, 0.1 mole of 5-ethyl-5-(1-methylbutyl)-barbituric acid is reacted with 0.2 mole of guanidine to give 25.6 g. of the crystalline bis-guanidine salt of 5-ethyl-5-(1-methylbutyl)-barbituric acid having a M.P. of 219–220° C. On chemical analysis the product is found to contain 47.63% C; 8.08% H; 28.93% N and 15.82% O; as compared with the theoretical analysis of 45.3% C; 8.2% H; 32.55% N; 13.95% O.

EXAMPLE III

*Bis-guanidine salt of 5-sec-butyl-5-ethylbarbituric acid*

Following the procedure of Example I, 0.1 mole of 5-sec-butyl-5-ethylbarbituric acid is reacted with 0.2 mole of guanidine to give 27.7 g. of the crystalline bis-guanidine salt of 5-sec-butyl-5-ethylbarbituric acid having a M.P. of 233–234° C. On chemical analysis the monohydrate product, $C_{11}H_{26}N_8O_3 \cdot 1H_2O$, is found to contain: 39.52% C and 7.93% H; as compared with the theoretical analysis of 39.3% C and 8.40% H.

EXAMPLE IV

*Bis-guanidine salt of 5,5-diallyl-barbituric acid*

Following the procedure of Example I, 0.1 mole of 5,5-diallyl-barbituric acid is reacted with 0.2 mole guanidine to give 28.9 g. of the crystalline bis-guanidine salt of 5,5-diallyl-barbituric acid salt. On chemical analysis the dihydrate product, $C_{12}H_{22}N_8O_3 \cdot 2H_2O$, is found to contain 39.9% C and 7.18% H; as compared with the theoretical analysis of 39.78% C and 7.18% H.

EXAMPLE V

*Bis-guanidine salt of 5-allyl-5-(1-methylbutyl)-2-thiobarbituric acid*

Following the procedure of Example I, 0.1 mole of 5-allyl-5-(1-methylbutyl)-2-thiobarbituric acid is reacted with 0.2 mole of guanidine to give 24.8 g. of the crystalline bis-guanidine 5-allyl-5-(1-methylbutyl)-2-thiobarbituric acid salt, having a M.P. of 202–203° C. On chemical analysis the hemihydrate product, $$C_{14}H_{28}N_8O_2S \cdot \tfrac{1}{2} H_2O$$

is found to contain 44.10% C and 7.72% H; as compared with a theoretical analysis of 44.10% C and 7.67% H.

EXAMPLE VI

*Bis-guanidine salt of 5-allyl-5-(1-cyclohexenyl)-2-thiobarbituric acid*

Following the procedure in Example I, 0.1 mole of 5-allyl-5-(1-cyclohexenyl)-2-thiobarbituric acid is reacted with 0.2 mole of guanidine to give the mixture bis-guanidine salt of 5-allyl-5-(1-cyclohexenyl)-thiobarbituric acid having a M.P. of 203–205° C. On chemical analysis the product is found to contain 49.32% C and 6.78% H; as compared with the theoretical analysis of 47.2% C and 6.85% H.

In accordance with the foregoing teaching of the present invention, it will be clear to those skilled in the art that the other therapeutically useful barbituric and thiobarbituric acids can be prepared as the bis-guanidine salts in precisely the same manner. It should thus be understood that the invention is not limited in its application to the herein specifically disclosed compounds.

Others may readily adapt the invention for use under various conditions of service, by employing one or more of the novel features disclosed or equivalents thereof. As at present advised with respect to the apparent scope of our invention, we desire to claim the following subject matter.

We claim:

1. The stable, crystalline, non-hygroscopic bis-guanidine salt of 5-ethyl-5-(1-methylbutyl)-2-thiobarbituric acid.
2. The stable, crystalline, non-hygroscopic bis-guanidine salt of 5-ethyl-5-(1-methylbutyl)-barbituric acid.
3. The stable, crystalline, non-hygroscopic bis-guanidine salt of 5-sec-butyl-5-ethylbarbituric acid.
4. The stable, crystalline, non-hygroscopic bis-guanidine salt of 5,5-diallyl-barbituric acid.
5. The stable, crystalline, non-hygroscopic bis-guanidine salt of 5-allyl-5-(1-methylbutyl)-2-thiobarbituric acid.
6. The stable, crystalline, non-hygroscopic bis-guanidine salt of 5-allyl-5-(1-cyclohexenyl)-2-thiobarbituric acid.
7. A stable, crystalline, non-hygroscopic, bis-guanidine salt of a therapeutically useful acid having the general formula:

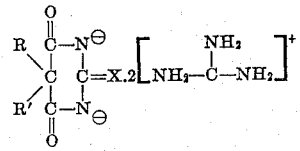

wherein R and R′ are selected from the group consisting of lower alkyl, lower alkenyl, monocycloloweralkyl and monocycloloweralkenyl, and X is selected from the group consisting of oxygen and sulfur.

References Cited in the file of this patent

UNITED STATES PATENTS

| | | |
|---|---|---|
| 2,019,936 | Shonle | Nov. 5, 1935 |

FOREIGN PATENTS

| | | |
|---|---|---|
| 222,552 | Germany | Oct. 30, 1908 |
| 267,380 | Germany | Aug. 18, 1912 |

OTHER REFERENCES

Henry: Journal Amer. Chem. Soc., vol. 74, p. 6303 (1952).

Whitmore: Organic Chemistry (Second Edition), p. 447 (1951).